United States Patent
Yamamoto et al.

(10) Patent No.: US 11,119,499 B2
(45) Date of Patent: Sep. 14, 2021

(54) MARKER SYSTEM

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 118 days.

(21) Appl. No.: 16/495,104

(22) PCT Filed: Mar. 23, 2018

(86) PCT No.: PCT/JP2018/011871
§ 371 (c)(1),
(2) Date: Sep. 18, 2019

(87) PCT Pub. No.: WO2018/181053
PCT Pub. Date: Oct. 4, 2018

(65) Prior Publication Data
US 2020/0133299 A1    Apr. 30, 2020

(30) Foreign Application Priority Data

Mar. 28, 2017  (JP) .............................. JP2017-062202
Mar. 30, 2017  (JP) .............................. JP2017-067119

(51) Int. Cl.
*G05D 1/02*     (2020.01)
*E01F 11/00*    (2006.01)

(52) U.S. Cl.
CPC ............ *G05D 1/0259* (2013.01); *E01F 11/00* (2013.01); *G05D 2201/0213* (2013.01)

(58) Field of Classification Search
CPC .......... G05D 1/0259; G05D 2201/0213; E01F 11/00

(Continued)

(56) References Cited

U.S. PATENT DOCUMENTS 4,852,677 A * 8/1989 Okazaki ............... G05D 1/0272
                                                                180/169
4,866,617 A * 9/1989 Matsuda .............. G05D 1/0246
                                                                701/25

(Continued)

FOREIGN PATENT DOCUMENTS

JP    S61-201285 A    9/1986
JP    10-154293 A     6/1998

(Continued)

OTHER PUBLICATIONS

International Search Report and Written Opinion dated May 29, 2018 for PCT/JP2018/011871 filed on Mar. 23, 2018, 7 pages including English Translation of the International Search Report.

(Continued)

*Primary Examiner* — Yazan A Soofi
(74) *Attorney, Agent, or Firm* — Xsensus LLP

(57) ABSTRACT

A marker system (1) including a sensor array (21) for detecting a magnetic marker laid in a road, a tag reader (34) which acquires marker position information indicating a laying position of the magnetic marker, an IMU (22) which estimates a relative position of a vehicle by inertial navigation calculation, and a control unit (32) which performs an arithmetic process for identifying a position of the vehicle based on the laying position of the detected magnetic marker, and also identifies the position of the vehicle after passage over the magnetic marker based on a relative position of the vehicle estimated by the IMU (22), thereby allowing stable identification of its own vehicle position without being affected by surrounding environment.

14 Claims, 11 Drawing Sheets

(58) Field of Classification Search
USPC .......................................................... 701/25
See application file for complete search history.

(56) References Cited

U.S. PATENT DOCUMENTS

| | | | | |
|---|---|---|---|---|
| 6,268,825 | B1* | 7/2001 | Okada | B60T 8/172 |
| | | | | 342/357.52 |
| 6,378,872 | B1* | 4/2002 | Moriarty | F16J 9/16 |
| | | | | 277/310 |
| 7,756,615 | B2* | 7/2010 | Barfoot | G08G 1/20 |
| | | | | 701/25 |
| 2002/0022926 | A1* | 2/2002 | Suzuki | G01C 21/26 |
| | | | | 701/525 |
| 2010/0141483 | A1* | 6/2010 | Thacher | G05D 1/0272 |
| | | | | 340/989 |
| 2011/0118967 | A1* | 5/2011 | Tsuda | B60W 30/10 |
| | | | | 701/117 |
| 2015/0247719 | A1* | 9/2015 | Huang | B62D 15/025 |
| | | | | 701/41 |
| 2019/0031076 | A1* | 1/2019 | Yamamoto | E01F 9/30 |
| 2019/0196496 | A1* | 6/2019 | Yamamoto | G06F 16/29 |
| 2020/0320870 | A1* | 10/2020 | Yamamoto | G05D 1/0261 |
| 2020/0332483 | A1* | 10/2020 | Michiharu | E01C 23/185 |

FOREIGN PATENT DOCUMENTS

| | | |
|---|---|---|
| JP | 2000-235414 A | 8/2000 |
| JP | 2001-264076 A | 9/2001 |
| JP | 2001-325691 A | 11/2001 |
| JP | 2007-333385 A | 12/2007 |
| JP | 2009-236691 A | 10/2009 |
| JP | 2013-519892 A | 5/2013 |

OTHER PUBLICATIONS

Extended European search report dated Sep. 3, 2020, in corresponding to European patent Application 18777837.8, 9 pages.
Jianqiang Wang et al., "RFID-Based Vehicle Positioning and Its Applications in Connected Vehicles", Sensors 2014, vol. 14, No. 3, Mar. 4, 2014, pp. 4225-4238, total 14 pages, XP055721522, D0I:10.3390/s140304225.

* cited by examiner

MARKER SYSTEM

CROSS-REFERENCE TO RELATED APPLICATIONS

The present application is based on PCT filing PCT/JP2018/011871, filed Mar. 23, 2018, which claims priority to JP Patent Application Nos. 2017-062202, filed Mar. 28, 2017, and JP 2017-067119, Mar. 30, 2017, the entire contents of each are incorporated herein by reference.

TECHNICAL FIELD

The present invention relates to a marker system using magnetic markers laid in a road.

BACKGROUND ART

Conventionally, a system for vehicles such as a car navigation system has been known, in which, for example, an absolute position is measured by receiving GPS waves for guidance to a destination set in advance (for example, refer to Patent Literature 1 described below). Driving assist control such as voice output for route guidance makes it possible to efficiently arrive at the destination without losing the route even traveling in an unfamiliar place.

Furthermore, for example, a system for vehicles including a database of 3D map data representing a road environment three-dimensionally including road shapes as well as surrounding environment such as surrounding buildings and level difference has also been suggested. This system for vehicles tries to achieve automatic driving by mapping own vehicle positions measured by using GPS on the 3D map data. If this automatic driving system is achieved, driving load when driving the vehicle can be reduced, and traffic accidents can also be decreased.

CITATION LIST

Patent Literature

Patent Literature 1: Japanese Unexamined Patent Application Publication No. 2001-264076

SUMMARY OF INVENTION

Technical Problem

However, the conventional systems for vehicles have the following problem. That is, while highly accurate identification of the own vehicle position is a key for ensuring accuracy of driving assist control, in the case of GPS, there is a problem in which positioning cannot be made in places where GPS waves are blocked, such as in a tunnel, and positioning accuracy is deteriorated in places where GPS waves are difficult to reach such as between buildings. Thus, if driving assist control or the like is based on the use of GPS, accuracy of control may fluctuate depending on surrounding environment.

The present invention was made in view of the above-described conventional problem, and is to provide a system for vehicles that allows stable identification of the own vehicle position without being affected by surrounding environment and is useful for ensuring accuracy of driving assist control.

Solution to Problem

The present invention resides in a marker system including a magnetic detection part provided to a vehicle to detect a magnetic marker laid in a road, a position information acquisition part which acquires marker position information indicating a laying position of the magnetic marker, a relative position estimation part which estimates a relative position of the vehicle by inertial navigation calculation with reference to any position of the vehicle, and a positioning part which performs an arithmetic process for identifying a position of the vehicle, wherein when the magnetic detection part detects the magnetic marker, the positioning part identifies the position of the vehicle based on a laying position indicated by a corresponding piece of the marker position information, and after passage over any said magnetic marker, the positioning part identifies the position of the vehicle based on the relative position of the vehicle estimated by the relative position estimation part with reference to the position of the vehicle identified when the magnetic marker is detected.

Advantageous Effects of Invention

When detecting the magnetic marker laid in the road, the marker system of the present invention acquires the marker position information to identify the laying position of the magnetic marker. Then, with reference to the position of the vehicle identified based on the laying position of the magnetic marker, the relative position after passage over the magnetic marker is estimated by inertial navigation calculation.

The magnetic marker can be detected with high reliability on a vehicle side without being affected by surrounding environment such as in a tunnel or between buildings. Based on such a laying position of the magnetic marker, the position of the vehicle can be identified with high accuracy in response to the detection of the magnetic marker. Then, at an intermediate position after passage over the magnetic marker and before detection of a new magnetic marker, the position of the vehicle can be identified based on the relative position.

As described above, the marker system of the present invention is a system for vehicles that allows stable identification of the position of the vehicle without being affected by surrounding environment and is useful for ensuring accuracy of driving assist control.

DESCRIPTION OF EMBODIMENTS

Figure 1:
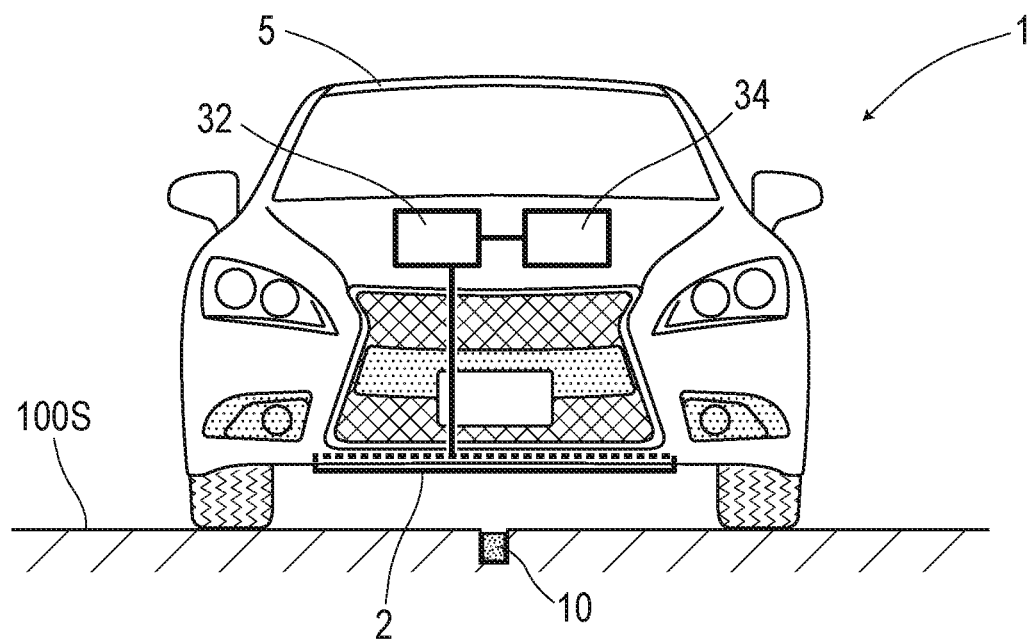
FIG. 1 is a descriptive diagram of a marker system in a first embodiment.

Suitable aspects of the present invention are described.

The relative position estimation part in marker system of one suitable aspect in the present invention estimates the relative position of the vehicle by using an azimuth of the vehicle identified in response to detection of at least two said magnetic markers arranged along a direction of which an absolute azimuth is known.

When at least two said magnetic markers are detected, the azimuth of the vehicle can be identified with high accuracy if the known direction is taken as a reference. The azimuth of the vehicle that was identified with high accuracy helps improving accuracy of estimation of a relative position by the relative position estimation part.

The relative position estimation part in the marker system of one suitable aspect in the present invention uses a positional shift between a first vehicle position identified when a first magnetic marker is detected and a second vehicle position identified when a second magnetic marker is detected to identify an estimation error of the relative position with reference to the first vehicle position, and after passage over the second magnetic marker, estimates the relative position of the vehicle with reference to the second vehicle position by an arithmetic process of suppressing the estimation error of the relative position.

At the time of detection of the second magnetic marker, the second vehicle position can be identified based on the laying position indicated by the marker position information, and thus a positional shift with respect to the first vehicle position can be identified with high accuracy. By using this positional shift, it is possible to identify an estimation error of the relative position estimated by the relative position estimation part with reference to the first vehicle position when the second magnetic marker is detected. This estimation error is effective in improving accuracy of estimation of the relative position by the relative position estimation part. After the second magnetic marker is detected, if the relative position of the vehicle is estimated by an arithmetic process of suppressing the estimation error, that positional accuracy of the relative position can be improved.

The position information acquisition part in the marker system of one suitable aspect in the present invention receives the marker position information wirelessly transmitted by a communication unit provided correspondingly to the magnetic marker.

The communication unit may be, for example, a radio beacon, infrared beacon, or the like installed on a road side, or may be a communication unit such as Bluetooth (registered trademark) unit.

The position information acquisition part may wirelessly supply electric power to a wireless tag retained by the magnetic marker as the communication unit, and may receive the marker position information wirelessly transmitted by the wireless tag in response to operation.

The wireless tag may be laid near the magnetic marker, or may be retained by the magnetic marker.

The marker system of one suitable aspect in the present invention includes a storage part which stores the marker position information, and the position information acquisition part acquires marker position information indicating a laying position of the magnetic marker detected by the magnetic detection part by referring to information stored in the storage part.

As a method of referring to the information in the storage part, for example, there is a method of selecting and acquiring marker position information indicating the nearest laying position with respect to the position of the vehicle identified based on the relative position acquired by inertial navigation calculation. If this method is performed, when the magnetic marker is detected, the highly-accurate laying position of the magnetic marker can be acquired by using the relative position.

EMBODIMENTS

Aspects for implementation of the present invention are specifically described by using the following embodiments.

First Embodiment

The present embodiment is an example regarding a marker system 1 for vehicles that allows stable identification of own vehicle position (position of the vehicle) without being affected by surrounding environment and is effective for ensuring accuracy of driving assist control. Details of this are described by using FIG. 1 to FIG. 9.

Figure 2:
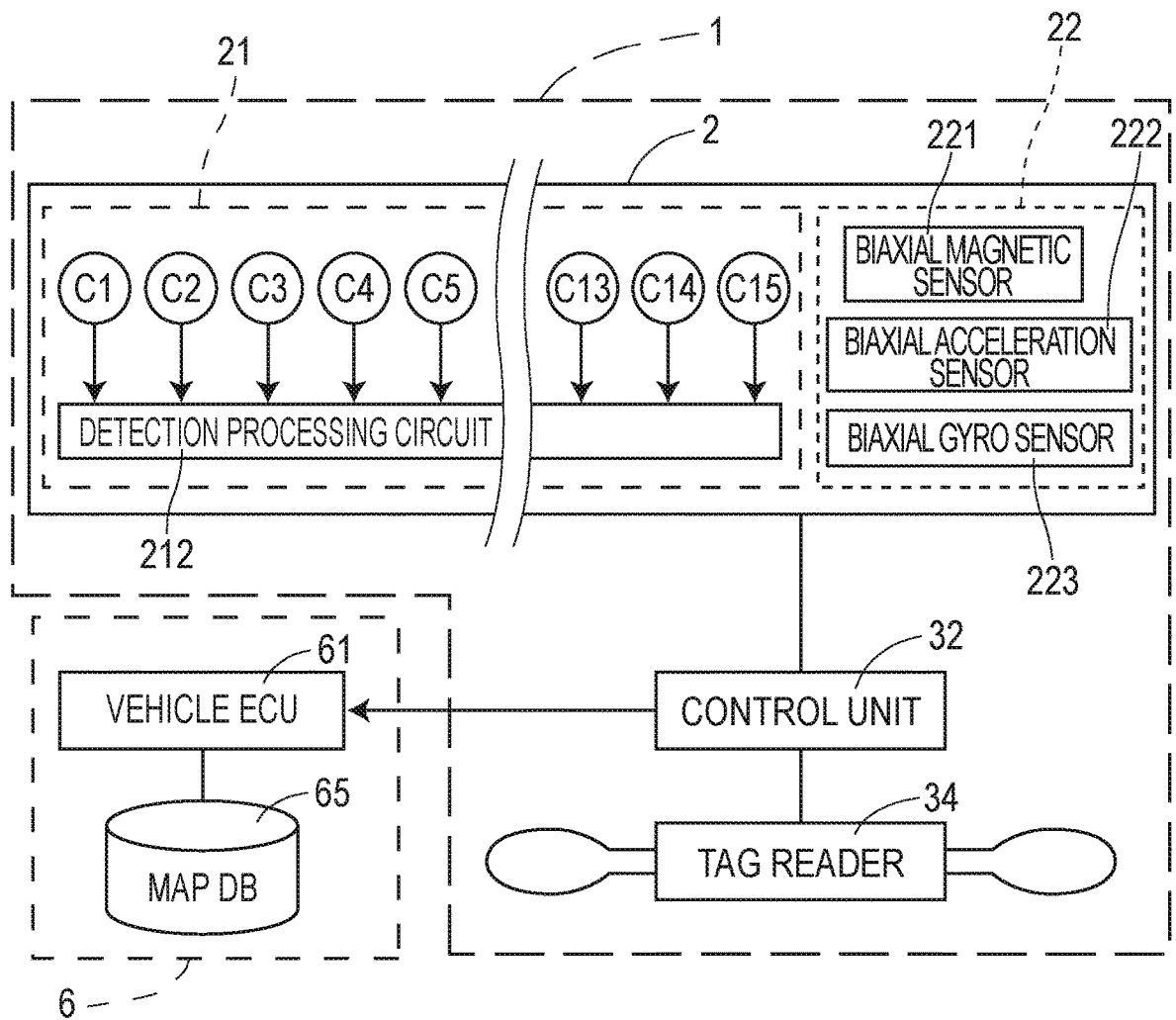
FIG. 2 is a block diagram depicting a system configuration on a vehicle side in the first embodiment.

The marker system 1 is, as in FIG. 1 and FIG. 2, configured to include a measurement unit 2 which performs magnetism detection and so forth; a tag reader 34 which is one example of a position information acquisition part which acquires marker position information indicating the laying position of a magnetic marker 10; and a control unit 32 which forms a positioning part that performs arithmetic processes for identifying its own vehicle position.

In the present embodiment, the above-described marker system 1 which identifies the own vehicle position is combined with an automatic driving system 6. Note in FIG. 1 that depiction of the automatic driving system 6 is omitted. The automatic driving system 6 (FIG. 2) is a system configured to include a vehicle ECU 61 which performs automatic driving control and a map database (map DB) 65 for storing detailed three-dimensional map data (3D map data). By taking the own vehicle position identified by the marker system 1 as a control input value, the vehicle ECU 61 controls a steering unit, engine throttle, brake, and so forth (not depicted) to make a vehicle 5 to automatically travel.

In the following, general description of the magnetic marker 10 laid in a road is made, and then details of the measurement unit 2, the tag reader 34, and the control unit 32 are described.

Figure 3:
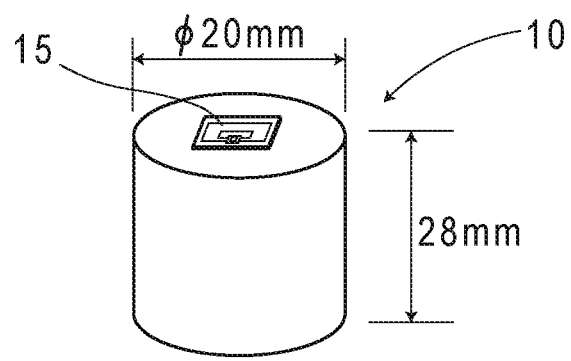
FIG. 3 is a descriptive diagram of a magnetic marker in the first embodiment.

The magnetic marker 10 is, as in FIG. 3, a road marker laid in a road surface 100S of a road where the vehicle 5 travels. The magnetic markers 10 are arranged along the center of a lane (reference sign 100 in FIG. 8) sectioned by left and right lane marks at spacings of, for example, 10 m.

The magnetic marker 10 forms, as in FIG. 1, a columnar shape having a diameter of 20 mm and a height of 28 mm, and is laid in a state of being accommodated in a hole provided in the road surface 100S. A magnet forming the magnetic marker 10 is a ferrite plastic magnet with magnetic powder of iron oxide as a magnetic material dispersed in a polymer material as a base material, and has a characteristic of a maximum energy product (BHmax)=6.4 kJ/m$^3$.

Part of specifications of the magnetic marker 10 of the present embodiment is listed in Table 1.

TABLE 1

| Type of magnet | Ferrite plastic magnet |
|---|---|
| Diameter | φ20 mm |
| Height | 28 mm |
| Magnetic flux density Gs of the surface | 45 mT |

This magnetic marker 10 can act magnetism of a magnetic flux density of 8 μT (microtesla) at a height of 250 mm, which is an upper limit of a range from 100 to 250 mm assumed as an attachment height of the measurement unit 2.

Figure 4:
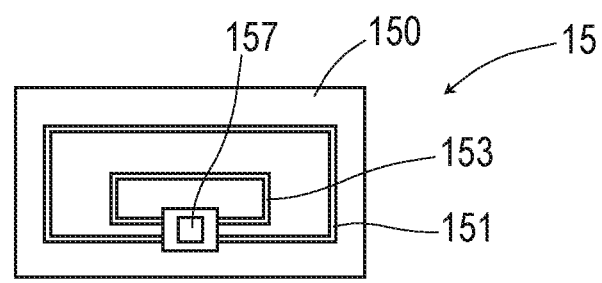
FIG. 4 is a front view of an RF-ID tag in the first embodiment.
Figure 5:
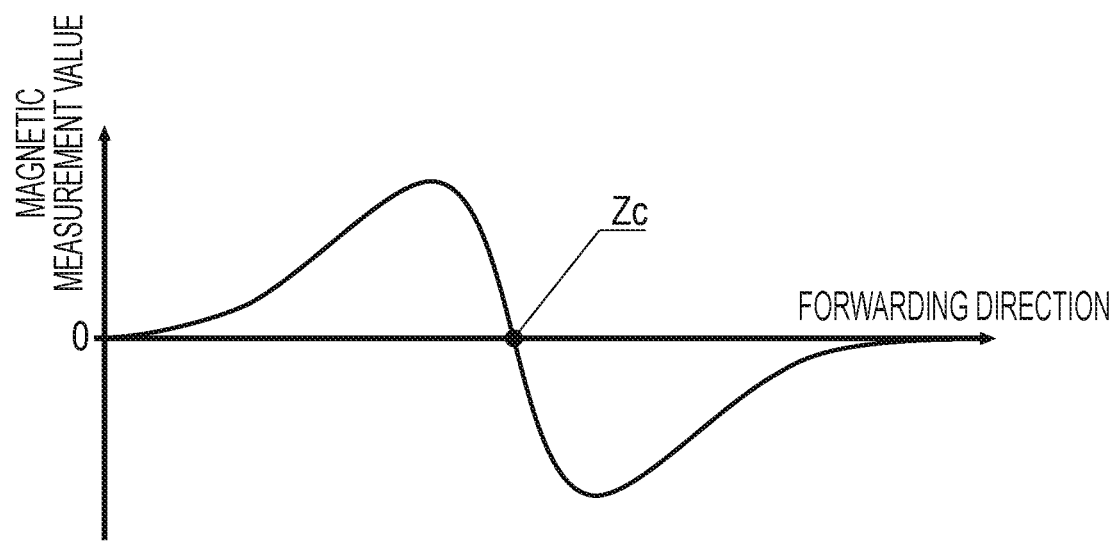
FIG. 5 is a descriptive diagram exemplarily depicting changes of a magnetic measurement value in a forwarding direction at the time of passage over the magnetic marker in the first embodiment.

On the magnetic marker 10 of the present embodiment, as in FIG. 3 and FIG. 4, an RF-ID (Radio Frequency IDentification) tag 15 that is a wireless tag which wirelessly outputs information is laminated and affixed on the surface located in a road surface 100S side. The RF-ID tag 15 operates by wireless external power supply, and transmits position data as marker position information indicating the laying position of the magnetic marker 10.

Here, as described above, the magnet of the magnetic marker 10 is one with magnetic powder of iron oxide dispersed in the polymer material. This magnet has low conductivity, and hardly generates an eddy current and so forth at the time of wireless power supply. Therefore, the RF-ID tag 15 affixed to the magnetic marker 10 can efficiently receive wirelessly-transmitted power.

The RF-ID tag 15 as one example of a communication unit may be an electronic component having an IC chip 157 mounted on a surface of a tag sheet 150 (FIG. 4) cut out from, for example, a PET (Polyethylene terephthalate) film. On the surface of the tag sheet 150, printed patterns of a loop coil 151 and an antenna 153 are provided. The loop coil 151 is a power-receiving coil where an induced current is generated by external electromagnetic induction. The antenna 153 is a transmission antenna for wirelessly transmitting position data and so forth.

Next, a measurement unit 2, a tag reader 34, and a control unit 32 included in the vehicle 5 are described.

The measurement unit 2 is a unit with a sensor array 21 as a magnetic detection part and an IMU (Inertial Measurement Unit) as an example of a relative position estimation part integrated together, as in FIG. 1 and FIG. 2. This measurement unit 2 is a unit in a rod shape extending in the vehicle-width direction, and is attached, for example, inside a front bumper of the vehicle in a state of facing the road surface 100S. In the case of the vehicle 5 of the present embodiment, the attachment height of the measurement unit with reference to the road surface 100S is 200 mm.

The sensor array 21 of the measurement unit 2 includes fifteen magnetic sensors Cn (n is an integer from 1 to 15) arrayed in straight line along the vehicle-width direction and a detection processing circuit 212 having a CPU and so forth not depicted incorporated therein (refer to FIG. 2). Note that the fifteen magnetic sensors Cn are arranged at a constant spacing of 10 cm in the sensor array 21.

The magnetic sensors Cn are sensors which detect magnetism by using known MI effect (Magnet Impedance Effect) in which the impedance of a magneto-sensitive body such as an amorphous wire sensitively changes in response to the external magnetic field. In each magnetic sensor Cn, magneto-sensitive bodies not depicted such as an amorphous wire are arranged along biaxial directions orthogonal to each other, thereby enabling detection of magnetism acting in the biaxial directions orthogonal to each other. Note in the present embodiment that the magnetic sensors Cn are incorporated in the sensor array 21 so as to enable detection of magnetic components in both the forwarding direction and the vehicle-width direction.

The magnetic sensors Cn are highly-sensitive sensors with a measurement range of the magnetic flux density of ±0.6 mT and a magnetic flux density resolution of 0.02 μT within the measurement range. In the present embodiment, the frequency of magnetism measurement by each magnetic sensor Cn of the measurement unit 2 is set to 3 kHz so as to support high-speed traveling of the vehicle.

Part of specifications of the magnetic sensors Cn is listed in Table 2.

TABLE 2

| Measurement range | ±0.6 mT |
|---|---|
| Magnetic flux density resolution | 0.02 μT |
| Sampling frequency | 3 kHz |

As described above, the magnetic marker 10 can act magnetism with a magnetic flux density equal to or larger than 8 μT in a range from 100 to 250 mm, which is assumed as the attachment height of the magnetic sensors Cn. If the magnetic marker 10 acts magnetism with a magnetic flux density equal to or larger than 8 μT, detection can be made with high reliability by using the magnetic sensors Cn with a magnetic flux density resolution of 0.02 μT.

The detection processing circuit 212 (FIG. 3) of the sensor array 21 is an arithmetic circuit which performs a marker detection process to detect magnetic markers 10. This detection processing circuit 212 is configured to utilize a CPU (central processing unit) which performs various calculations as well as memory elements such as a ROM (read only memory) and RAM (random access memory), and so forth.

The detection processing circuit 212 acquires sensor signals outputted from each magnetic sensor Cn at a frequency of 3 kHz to perform a marker detection process, and then inputs the detection result of the marker detection process to the control unit 32. In this marker detection process, although details will be described further below, a lateral shift amount of the vehicle 5 with respect to the detected magnetic marker 10 is measured in addition to detection of the magnetic marker 10.

The IMU 22 incorporated in the measurement unit 2 is an inertial navigation unit which estimates a relative position of the vehicle 5 by inertial navigation calculation. The IMU 22 includes a biaxial magnetic sensor 221 as an electronic compass which measures azimuth, a biaxial acceleration sensor 222 which measures acceleration, and a biaxial gyro sensor 223 which measures angular velocity. The IMU 22 calculates a displacement amount by second-order integration of acceleration, and accumulates displacement amounts along changes of the vehicle 5 in the forwarding direction detected by the biaxial gyro sensor 223 or the measured azimuth to calculate a relative position with respect to a reference position. By using the relative position estimated by the IMU 22, the own vehicle position can be identified even when the vehicle 5 is positioned between adjacent magnetic markers 10.

The above-described tag reader 34 is a communication unit which wirelessly communicates with the RF-ID tag 15 laminated and affixed on the surface of the magnetic marker 10. The tag reader 34 wirelessly transmits electric power required for operation of the RF-ID tag 15, and receives position data transmitted from the RF-ID tag 15. This position data, which is one example of marker position information, is data representing the laying position (absolute position) of the corresponding magnetic marker 10.

The above-described control unit 32 is a unit which controls the measurement unit 2 and the tag reader 34, and also identifies the own vehicle position as the position of the vehicle 5 in real time. The control unit 32 inputs the own vehicle position to the vehicle ECU 61 configuring the automatic driving system of the vehicle 5.

The control unit 32 includes an electronic substrate (depiction is omitted in the drawing) mounted thereon a CPU which performs various calculations as well as memory elements such as a ROM and RAM, and so forth. A method for the control unit 32 to identify the own vehicle position differs whether the vehicle 5 has reached a magnetic marker 10 or the vehicle 5 is positioned between adjacent magnetic markers 10. Although details will be described further below, in the former case, the control unit 32 identifies the own vehicle position based on the position data received from the RF-ID tag 15 affixed to the magnetic marker 10. On the other hand, in the latter case, the control unit 32 identifies the own vehicle position based on the relative position of the vehicle 5 estimated by inertial navigation calculation.

Next, (1) a marker detection process by the marker system 1 and (2) a flow of the entire operation of the vehicle 5 including the marker system 1 of the present embodiment are described.

(1) Marker Detection Process

The marker detection process is a process performed by the sensor array 21 of the measurement unit 2. As described above, the sensor array 21 performs the marker detection process by using the magnetic sensors Cn at the frequency of 3 kHz.

As described above, the magnetic sensors Cn are configured to measure magnetic components in the forwarding direction and the vehicle-width direction of the vehicle 5. For example, when any of these magnetic sensors Cn moves in the forwarding direction to pass straight above the magnetic marker 10, the magnetic measurement value in the forwarding direction is reversed between positive and negative before and after the magnetic marker 10 as in FIG. 5, and changes so as to cross zero at the position straight above the magnetic marker 10. Therefore, during traveling of the vehicle 5, it can be determined that the measurement unit 2 is positioned straight above the magnetic marker 10 when zero-cross Zc occurs where the magnetism detected by any of the magnetic sensors Cn in the forwarding direction is reversed between positive and negative. The detection processing circuit 212 determines that the magnetic marker 10 is detected when, as described above, the measurement unit 2 is positioned straight above the magnetic marker 10 and the zero-cross of the magnetic measurement value in the forwarding direction occurs.

Figure 6:
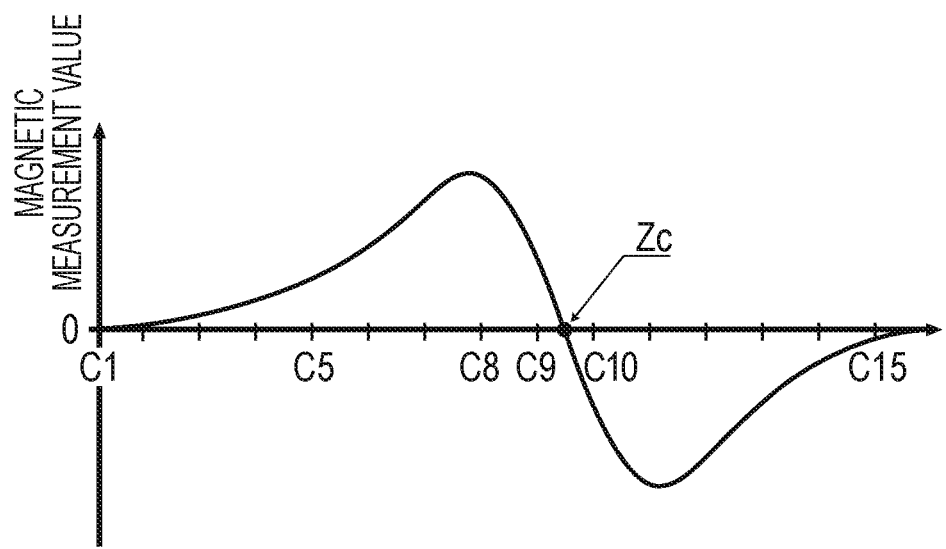
FIG. 6 is a descriptive diagram exemplarily depicting a distribution curve of magnetic measurement values in a vehicle-width direction by magnetic sensors Cn arrayed in the vehicle-width direction in the first embodiment.

Also, for example, assume a magnetic sensor with the same specifications as the magnetic sensor Cn is moving along a virtual line in the vehicle-width direction passing straight above the magnetic marker 10. In this assumption, the magnetic measurement value in the vehicle-width direction is reversed between positive and negative on both sides across the magnetic marker 10 and changes so as to cross zero at a position straight above the magnetic marker 10. In the case of the measurement unit 2 with fifteen magnetic sensors Cn arrayed in the vehicle-width direction, the magnetism in the vehicle-width direction detected by the magnetic sensors Cn differ in positive or negative, depending on which side the sensor is present with respect to the magnetic marker 10 (FIG. 6).

According to a distribution curve in FIG. 6 exemplarily depicting the magnetic measurement values in the vehicle-width direction of each of the magnetic sensors Cn of the measurement unit 2, a position between adjacent two magnetic sensors Cn across the zero-cross Zc where the magnetism in the vehicle-width direction is reversed between positive and negative, or a position straight below any of the magnetic sensors Cn where the detected magnetism in the vehicle-width direction is zero and the magnetism of those on both outer sides of the magnetic sensor Cn is reversed between positive and negative is the position of the magnetic marker 10 in the vehicle-width direction. The detection processing circuit 212 measures a deviation of the position of the magnetic marker 10 in the vehicle-width direction with respect to the center position (the position of a magnetic sensor C8) of the measurement unit 2 as the above-described lateral shift amount. For example, in the case of FIG. 6, the position of the zero-cross Zc corresponds to a position to C9.5 approximately the midpoint between C9 and C10. As described above, since the spacing between the magnetic sensors C9 and C10 is 10 cm, the lateral shift amount of the magnetic marker 10 will be (9.5−8)×10 cm with reference to C8 positioned at the center of the measurement unit 2 in the vehicle-width direction.

(2) Entire Operation of Vehicle

Figure 7:
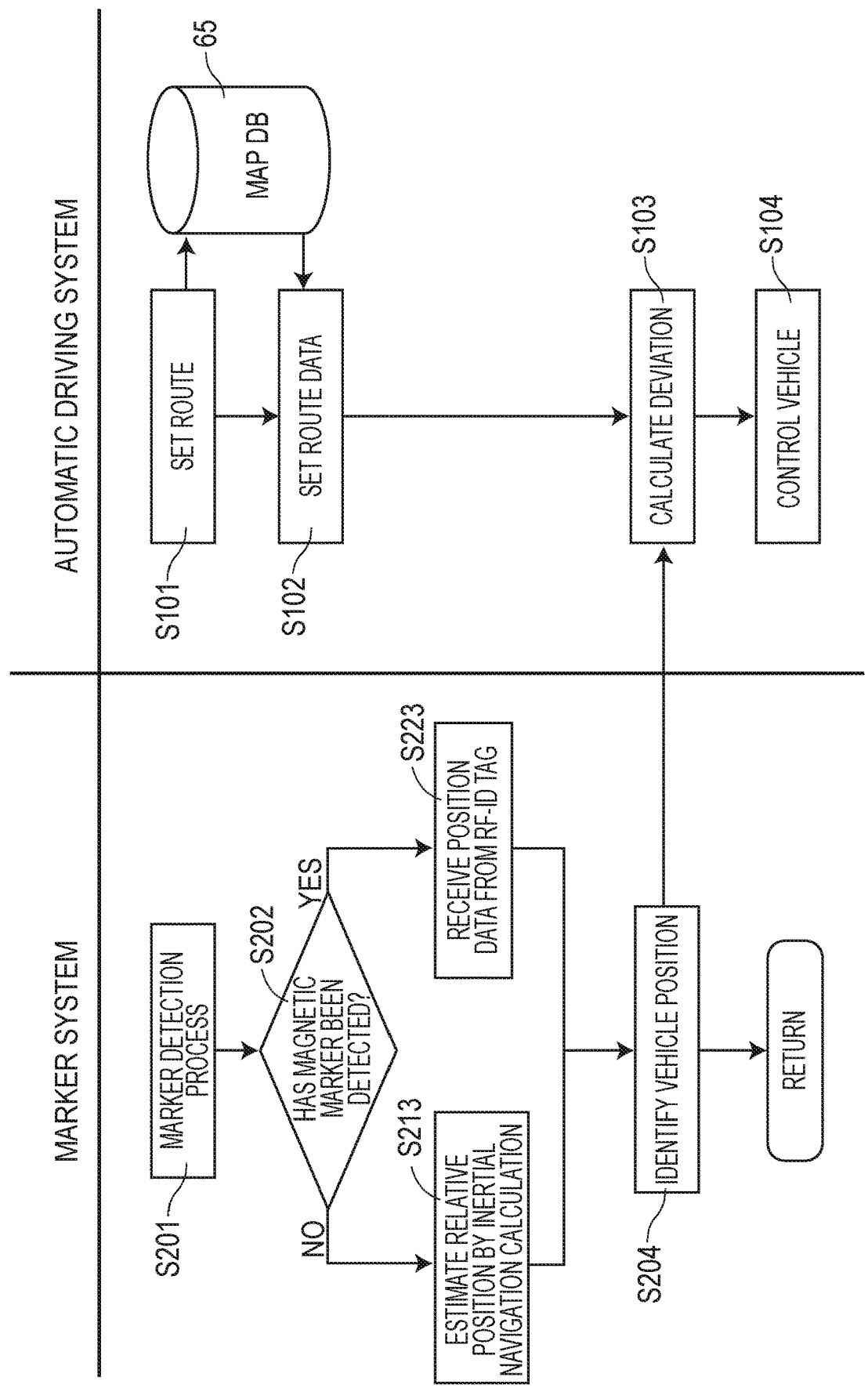
FIG. 7 is a descriptive diagram of system operation in the first embodiment.
Figure 8:
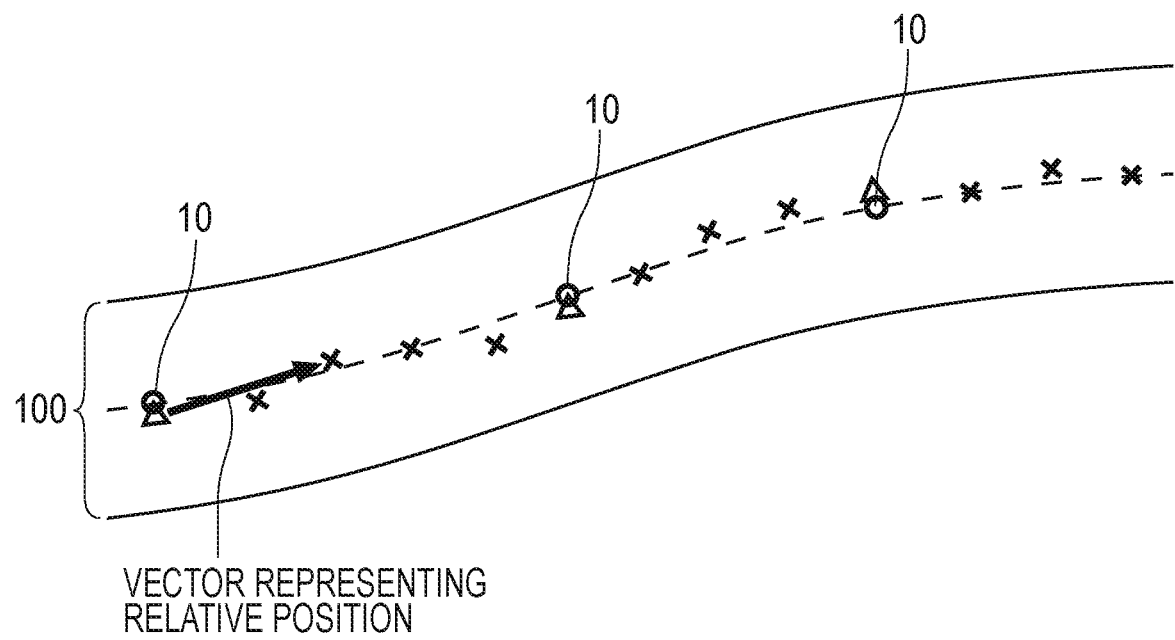
FIG. 8 is a descriptive diagram of a method for identifying an own vehicle position using the marker system in the first embodiment.

Next, the entire operation of the vehicle 5 including the marker system 1 and the automatic driving system 6 is described with reference to FIG. 7 and FIG. 8.

When a traveling route is set to the automatic driving system 6 (S101), corresponding data is read from the map DB 65 which stores 3D map data, and detailed route data as a control target of automatic driving is set (S102). The route data is data including a series of points represented by at least absolute position data, for example, as indicated by a broken line in FIG. 8.

On the other hand, the marker system 1 under control mode, in which the vehicle 5 travels by automatic driving, repeatedly performs the above-described marker detection process by the sensor array 21 (S201). If the magnetic marker 10 was detected (S202: YES), the marker system 1 receives position data (marker position information) representing the laying position of the magnetic marker 10 from the RF-ID tag 15 (S223). Then, with reference to the laying position of the magnetic marker 10 represented by the position data, a position offset by the lateral shift amount measured by the measurement unit 2 in the marker detection process is identified as the own vehicle position (exemplarily depicted by a triangle mark in FIG. 8) (S204).

On the other hand, when the vehicle 5 is positioned between adjacent magnetic markers 10 and the magnetic marker 10 cannot be detected (S202: NO), the own vehicle position identified based on the laying position of the nearest magnetic marker 10 detected (position with the triangle mark in FIG. 8) is taken as a reference position, and a relative position of the vehicle 5 is estimated by inertial navigation calculation. Specifically, as described above, a displacement amount is calculated by second-order integration of the measured acceleration by the IMU 22 incorporated in the measurement unit 2, and these displacement amounts are accumulated along changes of the vehicle 5 in the forwarding direction detected by the biaxial gyro sensor 223 and the measured azimuth, thereby estimating the relative position of the vehicle 5 with respect to the above-described reference position. Then, as exemplarily depicted in FIG. 8, a position with a cross mark moved from the reference position by this relative position is identified as the own vehicle position. Note that one example of a vector representing this relative position is depicted in FIG. 8.

Figure 9:
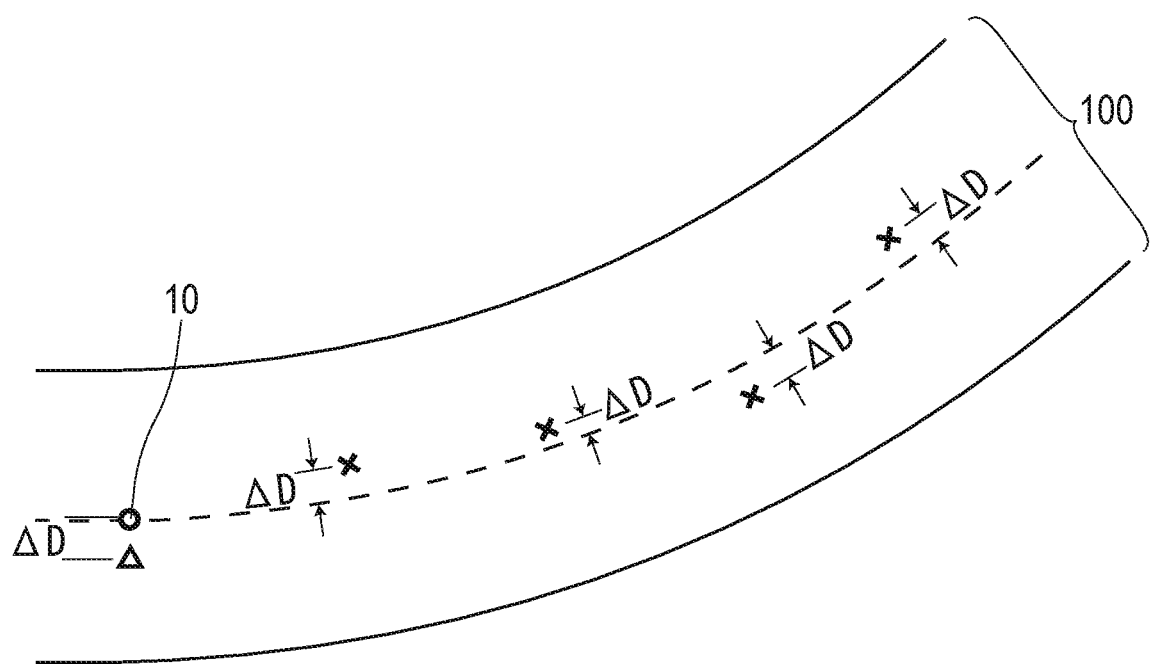
FIG. 9 is a descriptive diagram depicting deviations of the own vehicle position with respect to a traveling route in the first embodiment.

The own vehicle positions identified by the marker system 1 (positions with triangle marks and cross marks in FIG. 8) are inputted to the vehicle ECU 61 of the automatic driving system 6, and deviations ΔD with respect to the route data as the control target indicated by the broken line in FIG. 9 are calculated (S103). Based on these deviations ΔD, the vehicle ECU 61 performs vehicle control such as steering control and throttle control (S104) to achieve automatic traveling.

As described above, the marker system 1 of the present embodiment identifies the own vehicle position by using the laying position of the magnetic marker 10 whenever detecting it and, between adjacent magnetic markers 10, estimates a relative position after passage over the magnetic marker 10 immediately before to identify the own vehicle position. In this manner, the marker system 1 is a system which provides the own vehicle position identified by utilizing the magnetic markers 10 to the driving assist system on a vehicle 5 side such as, for example, the automatic driving system 6.

Since this marker system 1 does not assume reception of GPS waves and so forth, positional accuracy does not become unstable even at a place where GPS waves cannot be received or become unstable, such as, for example, in a tunnel or between buildings. By using the own vehicle position generated by the marker system 1, driving assist control with high accuracy can be achieved without being affected by surroundings. In the present embodiment, the vehicle including the IMU 22 is exemplarily described. In place of the IMU 22, the vehicle may include a gyro compass. By using the gyro compass, inertial navigation can be achieved.

In the present embodiment, the configuration is exemplarily described in which the RF-ID tag 15 is affixed to every magnetic marker 10. In place of this, the RF-ID tag 15 may be affixed to only part of the magnetic markers 10, and marker database (marker DB forming one example of a storage part) which stores position data (marker position information) of the laying positions (absolute positions) of the magnetic markers 10 may be provided.

At the time of detection of the magnetic marker 10 with the RF-ID tag 15 affixed thereto, the position data of its laying position is received from the RF-ID tag 15 to allow the own vehicle position to be identified. On the other hand, when the magnetic marker 10 without the RF-ID tag 15 affixed thereto is detected, the above-described position data in the marker DB may be referred to. When referring the marker DB, the magnetic marker nearest to the own vehicle position identified by using inertial navigation calculation may be selected and the position data of the selected magnet marker may be acquired as position data indicating the laying position of the detected magnetic marker 10.

Note that in place of the RF-ID tag 15, a communication unit such as a radio beacon or infrared beacon installed on a road side or the like may be adopted. In this case, in place of the tag reader 34, a receiving apparatus for the radio beacon or the like functions as a position information acquisition part.

A configuration may be such that the magnetic markers 10 are laid so that magnetic polarities form a predetermined pattern, for example, with the N pole being as 1 and the S pole being as zero, the pattern of magnetic polarities represents bit code. This bit code may be adopted as marker position information indicating the laying positions of the magnetic markers 10. Also, the above-described bit code may be used as, for example, code for acquiring the laying positions of the magnetic markers 10 with reference to the above-described marker DB. Note that the number of installation of patterns of polarities may be smaller than the number of magnetic markers 10, similar to the above-described case in which the RF-ID tag 15 is affixed to part of the magnetic markers 10. The pattern of polarities of the magnetic markers 10 can be identified by a combination of the magnetic sensors Cn and the detection processing circuit 212. In this case, the combination of the magnetic sensors Cn and the detection processing circuit 212, the above-described marker DB, and so forth function as a position information acquisition part.

The own vehicle position may be acquired with relatively low accuracy by identifying an intersection by image recognition or the like of a structure on a road environment, such as a traffic board of an intersection name or a traffic signal. When any magnetic marker 10 is detected, the position data of the above-described marker DB is referred to using this own vehicle position with low accuracy, and the nearest position data may correspond as the laying position of the detected magnetic marker 10. In this manner, if the laying position of any magnetic marker 10 can be identified, the laying position of another magnetic marker 10 can be identified by using estimation of the relative position by inertial navigation calculation. For example, the marker DB may be referred to using the own vehicle position based on the estimated relative position, and the nearest position data may correspond as the laying position of the detected magnetic marker 10. In this case, a camera which takes an image of a road environment ahead of the vehicle, an image recognition apparatus which performs image processing on a taken image, a marker DB, and so forth function as a position information acquisition part.

For example, means may be provided for a vehicle crew to designate the own vehicle position by, for example, touch operation or the like on a display displaying a map. While traveling after the own vehicle position being designated and before any magnetic marker is detected, the relative position may be estimated by using inertial navigation calculation with reference to the designated own vehicle position, and the own vehicle position during traveling may be identified. Thereafter, when any magnetic marker is detected, this own vehicle position is used to refer to the position data in the above-described marker DB, thereby identifying the laying position of the magnetic marker in a manner similar to the above.

In the present embodiment, the marker system 1 to be combined with the automatic driving system 6 is exemplarily described. In place of the automatic driving system 6, a lane departure warning system which warns of departure from the lane or a lane keep system which activates steering assist force to automatically steer a steering wheel to travel along the lane or to avoid departure from the lane may be employed.

Note that if the vehicle 5 can be connected to a communication network such as the Internet, the function of a positioning part which identifies the position of the vehicle may be provided to a server apparatus. The vehicle 5 may transmit information required for identifying the position of the vehicle to the server apparatus. The function of the above-described marker DB, an image recognition apparatus, and so forth forming a position information acquisition part may also be provided by the server apparatus. As for the relative position estimation part, the configuration may be such that calculation for estimating the relative position of the vehicle is performed by the server apparatus and combined with a vehicle onboard sensor or the like which measures acceleration and so forth of the vehicle.

Second Embodiment

Figure 10:
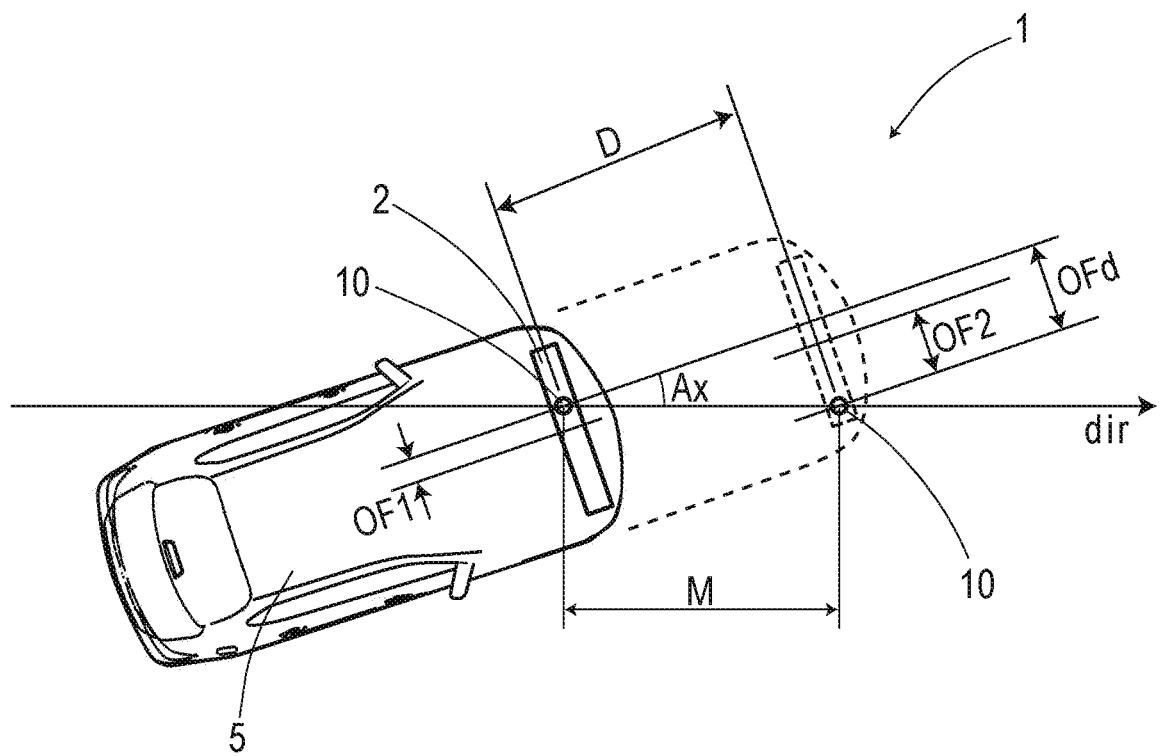
FIG. 10 is a descriptive diagram of the method for specifying an azimuth of a vehicle in a second embodiment.

The present embodiment is an example to which a configuration for identifying the azimuth of the vehicle is added to the marker system of the first embodiment. Details of this are described with reference to FIG. 10.

The marker system 1 of the present embodiment is a system including two magnetic markers 10 arranged along a direction dir of which the absolute azimuth is known. These two magnetic markers 10 are arranged in a marker span M of, for example, 2 m, which is relatively short. And, these paired two magnetic markers 10 with the spacing of 2 m are arranged every 10 m along the center of the lane.

If a lateral shift amount with respect to each magnetic marker 10 is measured when the vehicle 5 passes over two magnetic markers 10 arranged in the marker span M of 2 m, a shift angle Ax of the azimuth (forwarding direction) of the vehicle with respect to the direction dir, in which these two magnetic markers 10 are arranged, can be calculated as follows. Here, of the two magnetic markers 10, a lateral shift amount with respect to the magnetic marker 10 on a former side to be detected first by the vehicle 5 is taken as OF1, and a lateral shift amount with respect to the magnetic marker 10 on a forward side to be detected later is taken as OF2, where the lateral shift amounts OF1 and OF2 are defined so as to have a positive or negative value across the center of the vehicle 5 in the vehicle-width direction as a boundary.

Change of the lateral shift amount $OFd=|OF2-OF1|$

Shift angle $Ax=\arcsin(OFd/M)$

Furthermore, if this shift angle Ax is found, a travel distance D of the vehicle 5 required for passage over the two magnetic markers 10 with the marker span M can be calculated, and the vehicle speed can be calculated with high accuracy. Here, a timing when the magnetic marker 10 on the former side is detected is taken as t1, and a timing when the magnetic marker 10 on the forward side in the forwarding direction is detected is taken as t2.

Travel distance $D=M\times\cos Ax$

Vehicle speed $V=D/(t2-t1)$

Using the above-described shift angle Ax, the azimuth of the vehicle 5 can be identified with respect to the direction dir in which the above-described two magnetic markers 10 are arranged and of which the absolute azimuth is known. If the azimuth of the vehicle 5 can be identified, an error included in the azimuth value calculated by the IMU can be identified, and thus correction of an error in a calculated value, adjustment of a correction coefficient in azimuth arithmetic process, setting and adjustment or the like of a constant such as an initial value to be applied to azimuth arithmetic process can be made.

Also, using the above-described vehicle speed V, an error of the speed (vehicle speed) found by integrating acceleration measured by the IMU can be identified. If an error included in the value of the speed found by the IMU integrating acceleration is identified, correction of an error in a calculated value, adjustment of a correction coefficient in speed arithmetic process, setting and adjustment or the like of a constant such as an initial value or a constant of integration to be applied to speed arithmetic process can be made.

In this manner, if the two magnetic markers 10 arranged along the direction dir of which the absolute azimuth is known are detected on the vehicle 5 side, the azimuth of the vehicle 5 can be identified. And, if the azimuth of the vehicle can be identified, accuracy of arithmetic process for a relative position acquired by inertial navigation calculation can be improved, and accuracy of a relative position after passage over the magnetic markers 10 can be improved.

Note that it has been exemplarily described that the number of magnetic markers 10 arranged along the known direction dir is two, the number may be three, four, or the like.

The direction of arrangement may be represented by a combination of magnetic polarities of the magnetic markers 10. For example, in the case of two magnetic markers 10, N pole-N pole may represent north, N pole-S pole may represent east, S pole-N pole may represent west, and S pole-S pole may represent south.

Note that other configurations and operations and effects are similar to those in the first embodiment.

Third Embodiment

The present embodiment is an example configured based on the marker system of the first embodiment so as to improve accuracy of estimation of a relative position by the IMU by using the magnetic markers 10. Details of this are described with reference to FIG. 11.

Figure 11:
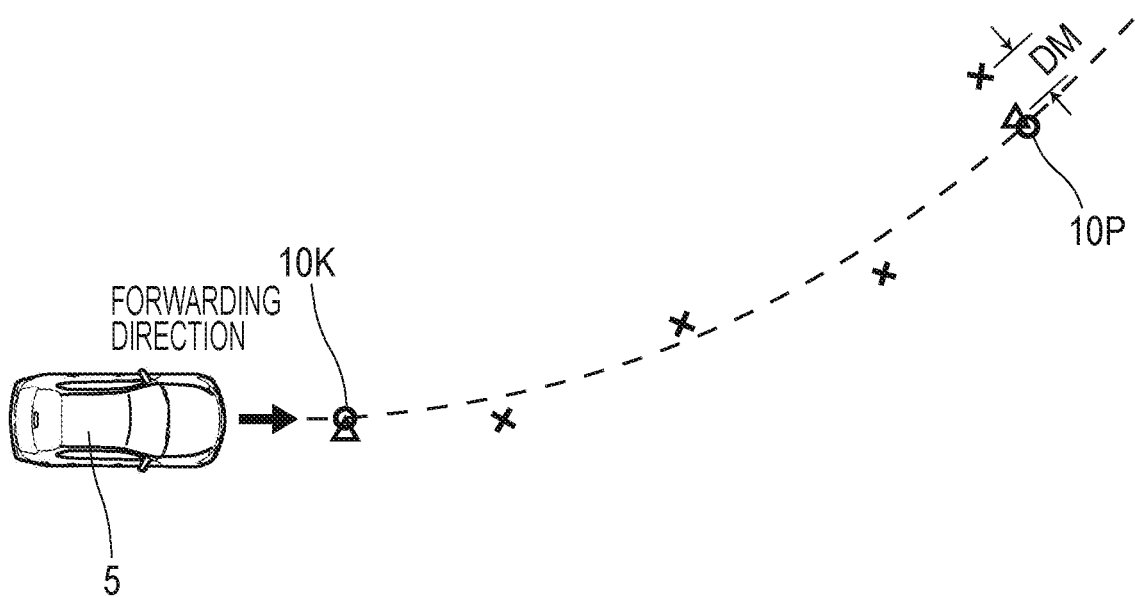
FIG. 11 is a descriptive diagram of a scheme of enhancing estimation accuracy by inertial navigation calculation in a third embodiment.

In FIG. 11, as with the first embodiment, route data as a control target is indicated by a broken line, the own vehicle position identified at the time of detection of the magnetic marker 10 is indicated by a triangle mark, and the own vehicle position identified based on the relative position estimated by inertial navigation calculation is indicated by a cross mark. For example, in the drawing, when a magnetic marker 10P on the forward side in the forwarding direction is detected, positions of two types can be calculated, that is, the own vehicle position with the triangle mark based on this magnetic marker 10P and the lateral shift amount, and the own vehicle position with the cross mark based on estimation of the relative position with reference to a magnetic marker 10K on the former side.

The own vehicle position with the triangle mark is a position identified with high accuracy based on the laying position of the magnetic marker 10. On the other hand, the own vehicle position with the cross mark is a position including an estimation error due to inertial navigation calculation. Therefore, an error DM which is a difference between these two types of own vehicle positions is mostly an estimation error due to inertial navigation calculation.

As for the process of arithmetic processing of a relative position acquired by inertial navigation calculation after passage over the magnetic marker 10P, if a process to decrease the above-described error DM is applied, accuracy of the own vehicle position after passage over the magnetic marker 10P can be improved. For example, assuming that the error is proportional to a distance from the magnetic marker 10K as a reference of inertial navigation, a process of subtracting the error from the laying position acquired by inertial navigation calculation may be performed. Alternatively, a correction coefficient that would make the above-described error to become close to zero may be found and applied for the azimuth measured by a gyroscope and/or acceleration measured by the acceleration sensor. Alternatively, a constant of integration for calculating displacement amount by second-order integration of acceleration may be adjusted to make this error become close to zero.

Note that other configurations and operations and effects are similar to those in the first embodiment or the second embodiment.

In the foregoing, specific examples of the present invention are described in detail as in the embodiments, these specific examples merely disclose examples of technology included in the scope of the invention for patent. Needless to say, the scope of the invention for patent should not be restrictively construed based on the configuration, numerical values, and so forth of the specific examples. The scope of the invention for patent includes techniques acquired by variously modifying, changing, or combining as appropriate the above-described specific examples by using known techniques, knowledge of a person skilled in the art, and so forth.

REFERENCE SIGNS LIST 1 marker system
10 magnetic marker
15 RF-ID tag (communication unit, wireless tag)
2 measurement unit
21 sensor array (magnetic detection part)
212 detection processing circuit
22 IMU (relative position estimation part)
32 control unit (positioning part)
34 tag reader (position information acquisition part)
5 vehicle
6 automatic driving system
61 vehicle ECU
65 map database (map DB)

The invention claimed is:

1. A drive assist system for a vehicle, the drive assist system comprising:
a magnetic sensor provided to the vehicle to detect a plurality of magnetic markers laid in a road; and
processing circuitry configured to
acquire marker position information indicating each laying position of the plurality of magnetic markers;
identify an absolute position of the vehicle based on a detection result of a magnetic marker of the plurality of magnetic markers by the magnetic sensor and the marker position information;
estimate a relative position of the vehicle from a reference position by inertial navigation calculation using inertial information of the vehicle; and
perform a drive assistance of the vehicle based on the estimated relative position of the vehicle, wherein
the processing circuitry continuously estimates the relative position of the vehicle, without stopping a process of the inertial navigation calculation, while updating the reference position with the absolute position of the vehicle identified in response to a detection of the magnetic marker every time the magnetic marker is detected during a traveling of the vehicle,
(1) in response to the magnetic sensor detecting a first magnetic marker of the plurality of magnetic markers, the processing circuitry identifies a first absolute position of the vehicle based on a first laying position indicated by a corresponding piece of the marker position information,
(2) after passage over the first magnetic marker and before arriving at a second magnetic marker of the plurality of magnetic markers, which is adjacent to the first magnetic marker, the processing circuitry identifies the absolute position of the vehicle using a combination of the first absolute position and a first relative position of the vehicle from the first absolute position, the first relative position being estimated using the inertial information of the vehicle,
(3) in response to the magnetic sensor detecting the second magnetic marker after detecting the first magnetic marker, the processing circuitry
identifies a second absolute position of the vehicle based on a second laying position indicated by another corresponding piece of the marker position information,
calculates an absolute position shift amount between the first absolute position and the second absolute position of the vehicle, and
calculates, as an estimation error of the position of the vehicle, a difference between the absolute position shift amount and the first relative position of the vehicle, and
(4) after passage over the second magnetic marker, the processing circuitry estimates a second relative position of the vehicle from the second absolute position by suppressing the calculated estimation error, and performs the drive assistance of the vehicle based on the second relative position.

2. The marker system in claim 1, wherein the processing circuitry estimates the relative position of the vehicle by using an azimuth of the vehicle identified in response to detection of at least the first and the second magnetic markers arranged along a direction of which an absolute azimuth is known.

3. The marker system in claim 1, wherein the processing circuitry receives the marker position information wirelessly transmitted by a transmitter provided correspondingly to the magnetic marker.

4. The marker system in claim 3, wherein the processing circuitry wirelessly supplies electric power to a wireless tag retained by the magnetic marker using the transmitter, and receives the marker position information wirelessly transmitted by the wireless tag in response to operation.

5. The marker system in claim 1, wherein the system includes a memory which stores the marker position information, and
the processing circuitry acquires the marker position information by referring to information stored in the memory.

6. The marker system in claim 2, wherein the processing circuitry receives the marker position information wirelessly transmitted by a transmitter provided correspondingly to the magnetic marker.

7. The marker system in claim 6, wherein the processing circuitry wirelessly supplies electric power to a wireless tag retained by the magnetic marker using the transmitter, and receives the marker position information wirelessly transmitted by the wireless tag in response to operation.

8. The marker system in claim 2, wherein the system includes a memory which stores the marker position information, and
the processing circuitry acquires the marker position information by referring to information stored in the memory.

9. The marker system in claim 3, wherein the system includes a memory which stores the marker position information, and the processing circuitry acquires the marker position information by referring to information stored in the memory.

10. The marker system in claim 6, wherein the system includes a memory which stores the marker position information, and
    the processing circuitry acquires the marker position information by referring to information stored in the memory.

11. The marker system in claim 4, wherein the system includes a memory which stores the marker position information, and
    the processing circuitry acquires the marker position information by referring to information stored in the memory.

12. The marker system in claim 7, wherein the system includes a memory which stores the marker position information, and
    the processing circuitry acquires the marker position information by referring to information stored in the memory.

13. The marker system in claim 1, wherein
    the first magnetic marker and the second magnetic marker are arranged along a direction of which an absolute azimuth is known with a marker span which is a predetermined spacing,
    the processing circuitry is configured to identify an absolute azimuth of the vehicle by identifying an angular deviation of an azimuth of the vehicle with respect to the direction of which the absolute azimuth is known by using a lateral shift amounts with respect to the first magnetic marker and the second magnetic marker and the marker span, and
    the processing circuitry is configured to estimate the relative position by using at least an estimation value of the azimuth of the vehicle, identifies an azimuth error which is a difference of the estimation value of the azimuth of the vehicle with respect to the absolute azimuth of the vehicle and estimates the relative position of the vehicle by the arithmetic process of suppressing the azimuth error.

14. The marker system in claim 1, wherein
    the first magnetic marker and the second magnetic marker are arranged along a direction of which an absolute azimuth is known with a marker span which is a predetermined spacing,
    the processing circuitry is configured to identify an actual speed of the vehicle based on a time from a timing when the vehicle passes over the first magnetic marker to a timing when the vehicle arrives at the second magnetic marker, and
    the processing circuitry is configured to estimate the relative position by using at least an estimation value of a speed of the vehicle, identifies a speed error which is a difference of the estimation value of the speed of the vehicle with respect to the actual speed of the vehicle and estimates the relative position of the vehicle by the arithmetic process of suppressing the speed error.

* * * * *